United States Patent
Yamaguchi et al.

(10) Patent No.: US 11,364,848 B2
(45) Date of Patent: Jun. 21, 2022

(54) ITEM HOLDING STRUCTURE

(71) Applicant: HONDA MOTOR CO., LTD., Tokyo (JP)

(72) Inventors: Taku Yamaguchi, Wako (JP); Maki Yamaguchi, Wako (JP); Masanori Yamahata, Wako (JP); Kenichi Toyonaga, Tochigi (JP); Maiko Haneishi, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 280 days.

(21) Appl. No.: 16/844,042

(22) Filed: Apr. 9, 2020

(65) Prior Publication Data

US 2020/0231094 A1  Jul. 23, 2020

Related U.S. Application Data

(63) Continuation of application No. PCT/JP2017/038342, filed on Oct. 24, 2017.

(51) Int. Cl.
*B60R 7/04* (2006.01)
*B60J 5/04* (2006.01)

(52) U.S. Cl.
CPC ............ *B60R 7/046* (2013.01); *B60J 5/0493* (2013.01)

(58) Field of Classification Search
CPC . B60R 7/046; B60R 2011/0021; B60J 5/0493
See application file for complete search history.

(56) References Cited

U.S. PATENT DOCUMENTS

| | | | |
|---|---|---|---|
| 4,696,848 A * | 9/1987 | Jones | B60R 13/0892 427/322 |
| 5,246,190 A * | 9/1993 | Swirkal | B60K 37/04 224/567 |
| 5,415,457 A * | 5/1995 | Kifer | B60R 7/043 224/543 |

(Continued)

FOREIGN PATENT DOCUMENTS

| | | |
|---|---|---|
| JP | 50-21537 U | 3/1975 |
| JP | 2-93151 U | 7/1990 |

(Continued)

OTHER PUBLICATIONS

Office Action dated Jul. 5, 2021, issued in counterpart JP Application No. 2019-549714, with Partial English Translation. (6 pages).

(Continued)

*Primary Examiner* — Justin M Larson
(74) *Attorney, Agent, or Firm* — WHDA, LLP

(57) ABSTRACT

An item holding structure in which at least one convex part and/or a plurality of concave parts are provided in an upper end part of a side wall part on a vehicle interior side in a recess-shaped part provided in an interior material of a door of a vehicle and operable by a passenger when opening and closing the door, wherein the interior material of the door has a hollow part that recesses so as to project in an outer side of a vehicle width direction under the recess-shaped part, and the item held by the convex part and/or concave part can be accommodated in the recessed part.

9 Claims, 9 Drawing Sheets

(56) References Cited

U.S. PATENT DOCUMENTS

| | | | | |
|---|---|---|---|---|
| 5,769,294 | A * | 6/1998 | Heinz | B60R 7/02 |
| | | | | 224/927 |
| 6,457,690 | B1 * | 10/2002 | Spykerman | B60R 7/10 |
| | | | | 224/313 |
| 7,111,894 | B2 | 9/2006 | Kora et al. | |
| 8,490,935 | B2 * | 7/2013 | Myers | B60R 7/10 |
| | | | | 248/289.11 |
| 10,632,887 | B2 * | 4/2020 | Yamaguchi | B60N 2/874 |
| 10,843,633 | B2 * | 11/2020 | Lynch | B60J 5/0468 |
| 2005/0242256 | A1 * | 11/2005 | Evans | B60R 7/08 |
| | | | | 248/307 |
| 2005/0252940 | A1 * | 11/2005 | Brandstetter | B60R 7/046 |
| | | | | 224/543 |
| 2009/0266858 | A1 * | 10/2009 | Vander Sluis | B60R 7/08 |
| | | | | 292/173 |
| 2011/0139846 | A1 * | 6/2011 | Lucas | B60R 7/046 |
| | | | | 224/544 |
| 2020/0231094 | A1 * | 7/2020 | Yamaguchi | B60R 7/046 |

FOREIGN PATENT DOCUMENTS

| | | |
|---|---|---|
| JP | 5-16499 U | 3/1993 |
| JP | H07-246836 A | 9/1995 |
| JP | H09-267635 A | 10/1997 |
| JP | 2000-153739 A | 6/2000 |
| JP | 2002-87169 A | 3/2002 |
| JP | 2005-001595 A | 1/2005 |
| JP | 2009-179300 A | 8/2009 |
| JP | 2010-137717 A | 6/2010 |
| JP | 2014-213699 A | 11/2014 |

OTHER PUBLICATIONS

Office Action dated Dec. 17, 2021, issued in counterpart JP Application No. 2019-549714, with partial English translation. (6 pages).
International Search Report dated Jan. 9, 2018, issued in counterpart International Application No. PCT/JP2017/038342 (2 pages).

* cited by examiner

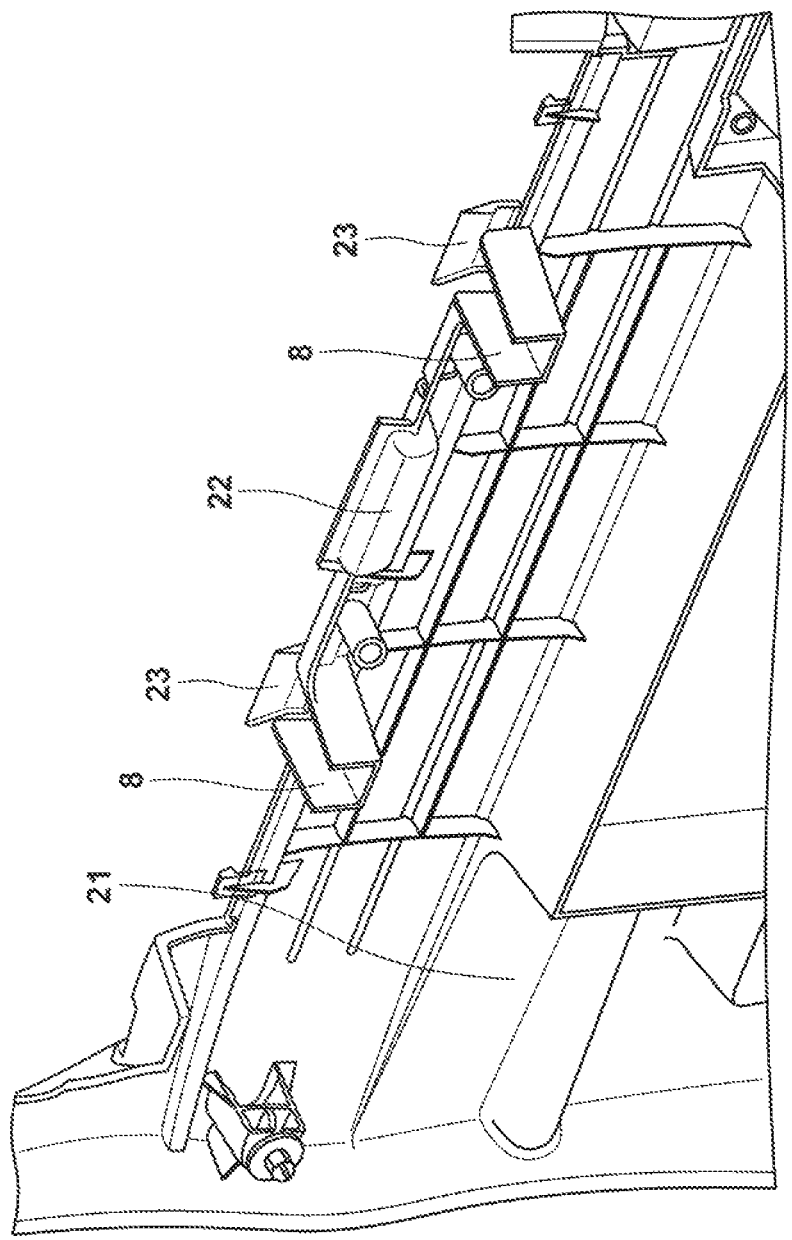

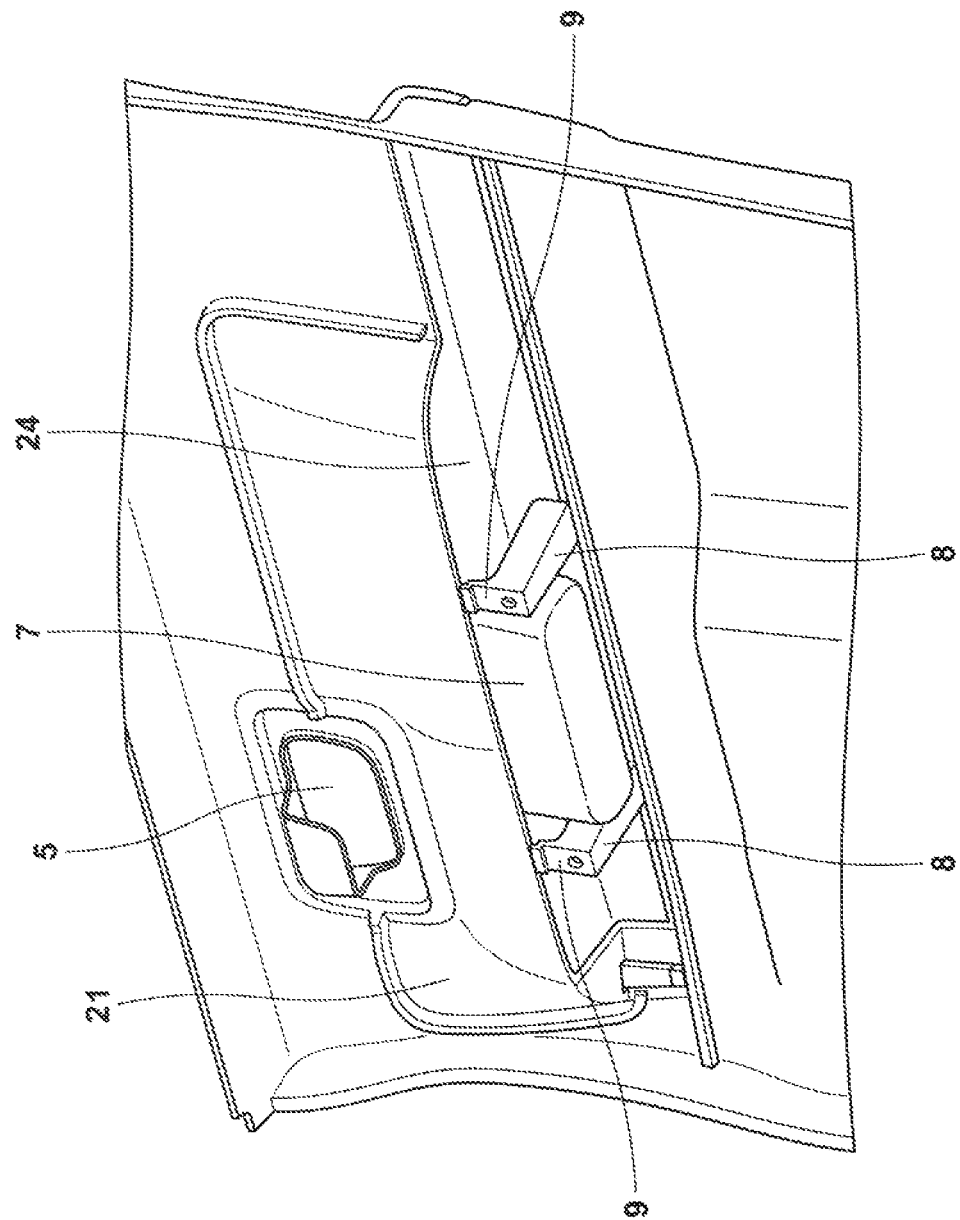

F I G. 6E
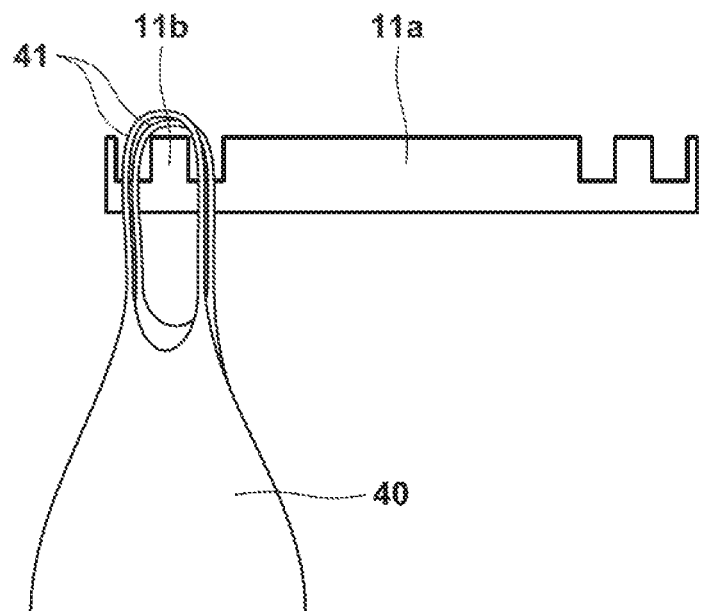
F I G. 6F
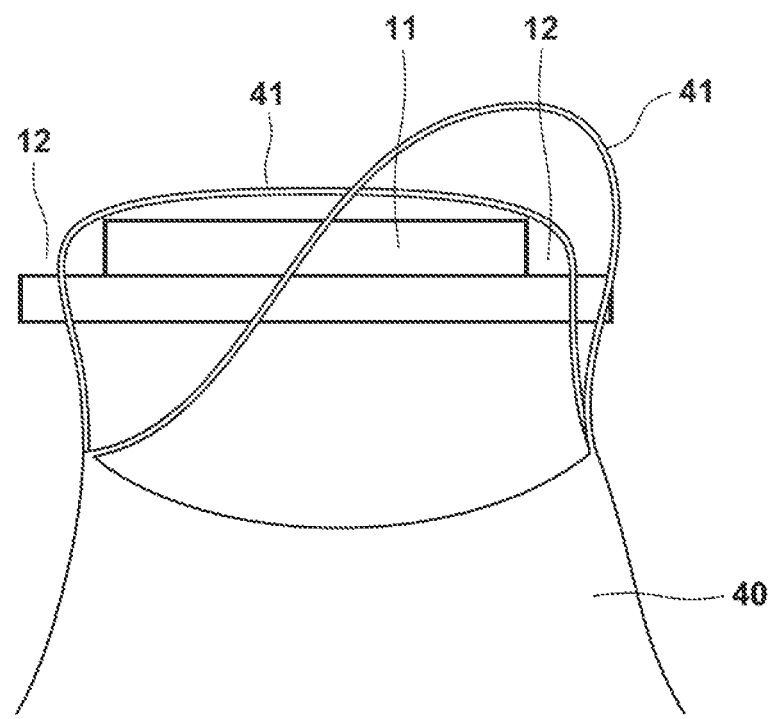

ITEM HOLDING STRUCTURE

CROSS-REFERENCE TO RELATED APPLICATION(S)

This application is a continuation of International Patent Application No. PCT/JP2017/038342 filed on Oct. 24, 2017, the entire disclosures of which is incorporated herein by reference.

BACKGROUND OF THE INVENTION

Field of the Invention

The present invention relates to an item holding structure for holding an article in a hanging state.

Description of the Related Art

Japanese Patent Laid-Open No. 2002-087169 and Japanese Patent Laid-Open No. 2000-153739 propose structures for holding a bag-like item in a hanging state. Japanese Patent Laid-Open No. 2002-087169 describes a structure in which a storage box main body 7 is embedded in an interior material such as a rear side trim 3 of a vehicle, and hook parts 11 and 12 are provided in a lid body 8 of the storage box main body 7 to allow a pair of handles 13a and 13b of a storage bag 13 to be hung on the hook parts 11 and 12. Japanese Patent Laid-Open No. 2000-153739 describes a structure in which a foldable semi-annular member 1 is attached to an interior material such as a door trim, and a pair of hook parts 2 for latching a pair of bag handles onto are provided in the semi-annular member 1.

In Japanese Patent Laid-Open No. 2002-087169 and Japanese Patent Laid-Open No. 2000-153739, since hook parts for hanging the handles of a bag are provided in a lid body, a semi-annular member or the like provided to be openable and closable with respect to an interior material of a vehicle, there is a risk that the hook parts will not be sufficiently strong in the case of hanging a weighty bag. Also, there is a risk that increasing the strength will complicate the structure and increase costs.

SUMMARY OF THE INVENTION

The present invention has been made in view of the above problems, and realizes an item holding structure that is able to hold an article in a stable manner with a simple structure.

In order to solve the above problems and achieve the object, an item holding structure of the present invention is wherein at least one convex part 11 and/or a plurality of concave parts 12 are provided in an upper end part 7c of a side wall part 7b on a vehicle interior side in a recess-shaped part 7 provided in an interior material 2 of a door 1 and operable by a passenger when opening and closing the door.

According to the present invention, an article can be held in a stable manner with a simple structure.

Other features and advantages of the present invention will become apparent from the following description taken in conjunction with the accompanying drawings. Note that the same reference numerals denote the same or like members throughout the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a perspective view showing the attachment structure of the door trim and the arm rest of the embodiment.

FIG. 5 is a perspective view showing the attachment structure of the door trim and the arm rest of the embodiment.

FIG. 6E is a diagram illustrating the form and function of the hanger part of the embodiment.

FIG. 6F is a diagram illustrating the form and function of the hanger part of the embodiment.

DESCRIPTION OF THE EMBODIMENTS

Hereinafter, an embodiment of the present invention will be described in detail with reference to the accompanying drawings.

Figure 1:
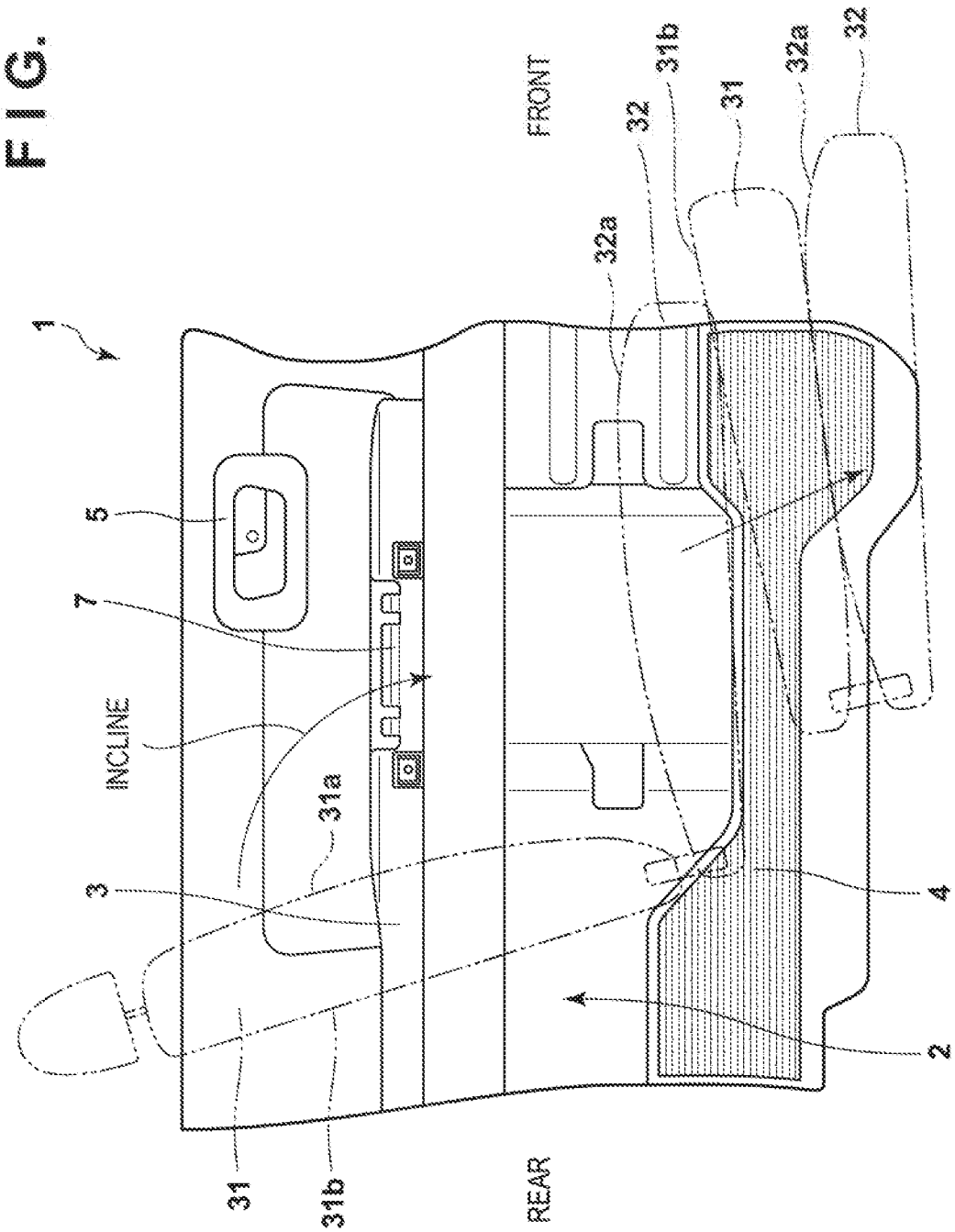
FIG. 1 is a diagram of a front passenger-side door having an item holding structure of an embodiment as seen from a vehicle interior side.
Figure 2:
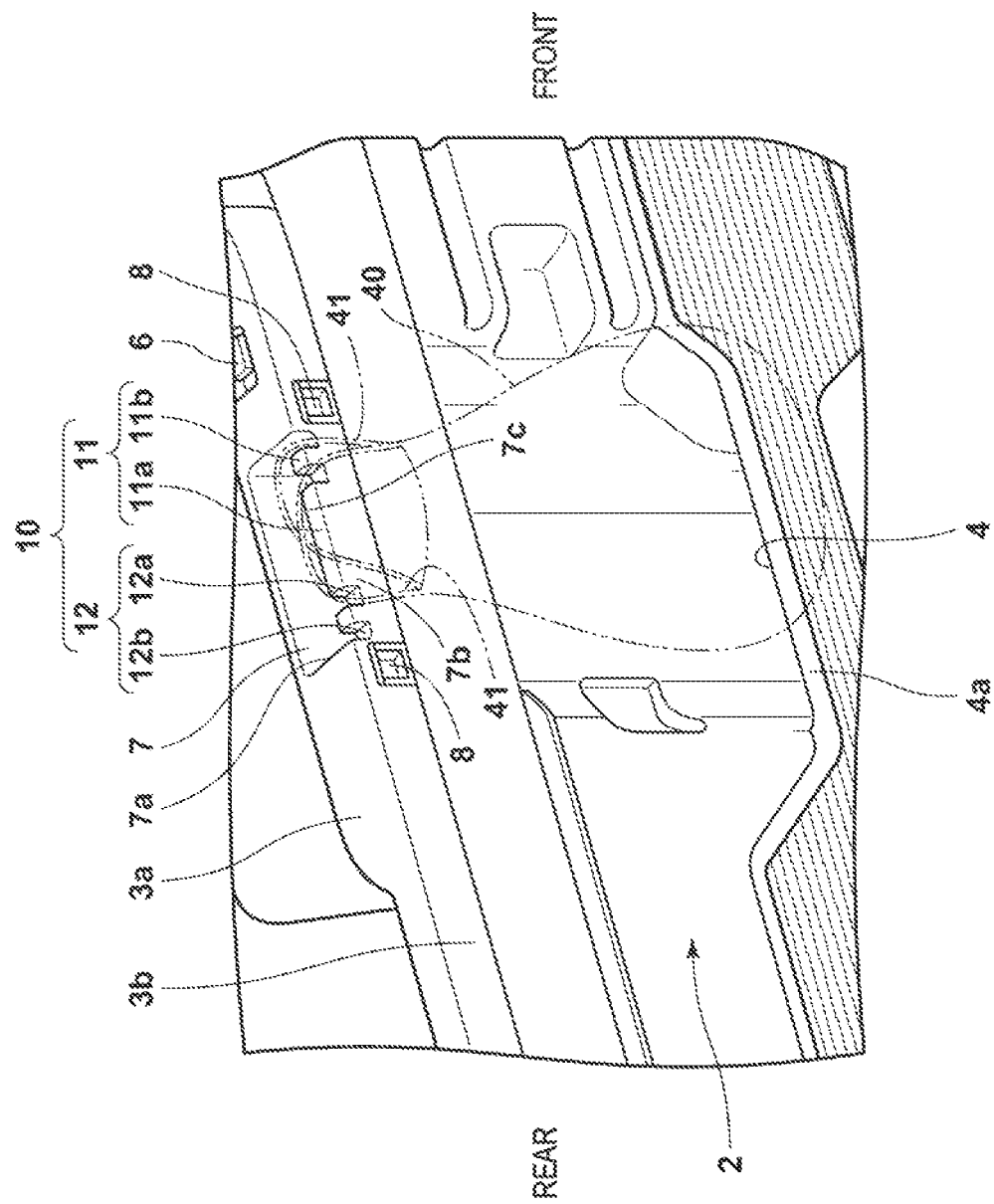
FIG. 2 is an enlarged perspective view of the area around a hanger part of a door trim in FIG. 1.
Figure 3:
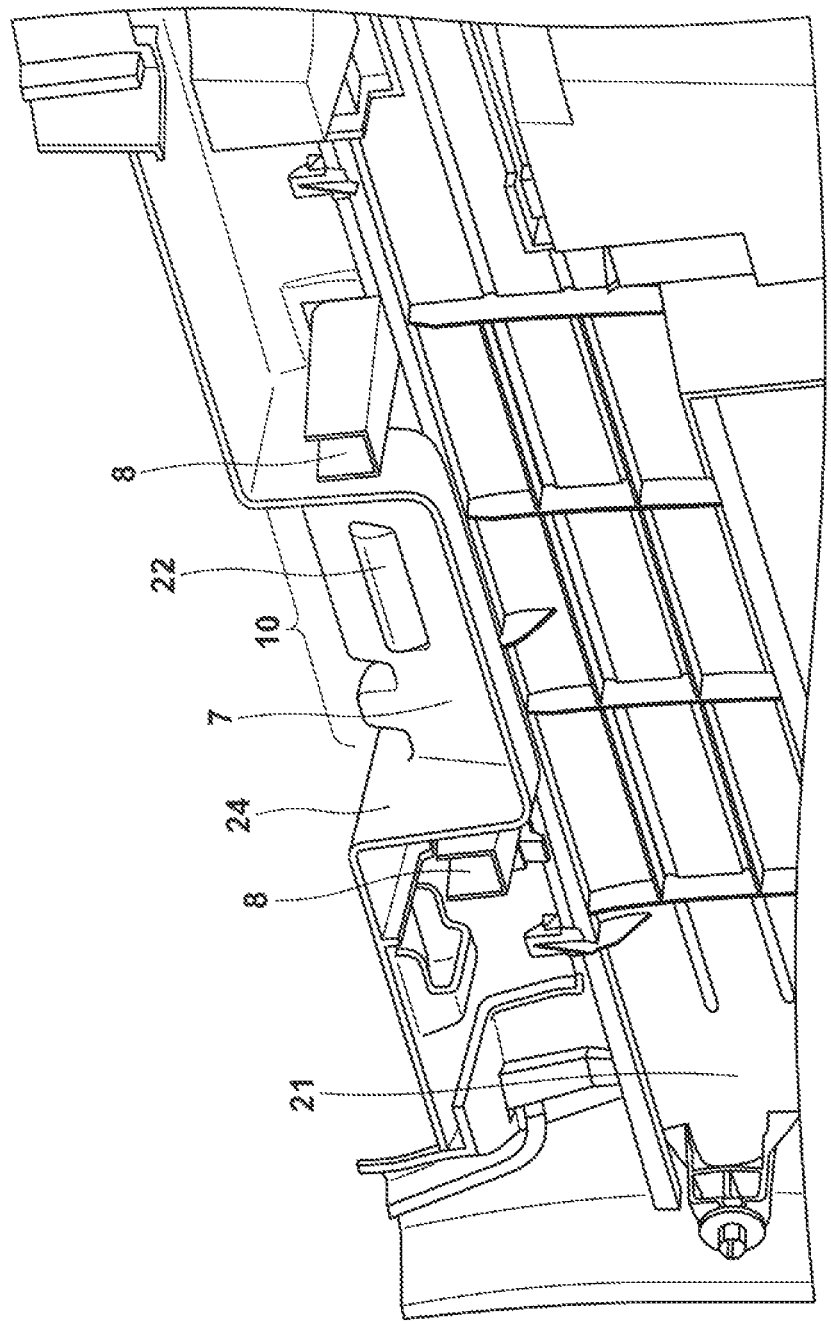
FIG. 3 is a perspective view showing an attachment structure of the door trim and an arm rest of the embodiment.

FIG. 1 is a diagram of a front passenger-side door having an item holding structure of the present embodiment as seen from the vehicle interior side. FIG. 2 is an enlarged perspective view of the area around a hanger part of a door trim in FIG. 1. FIGS. 3 to 5 are perspective views showing an attachment structure of the door trim and an arm rest of the present embodiment. FIGS. 6A to 6H are diagrams illustrating the form and function of the hanger part of the present embodiment.

The item holding structure of the present embodiment has a hanger part 10 formed in a part of a door trim 2 that is mounted on the vehicle interior side of a door panel (inner panel), which is not illustrated, of a door provided in the vehicle body in an openable and closable manner. Note that, hereinafter, an item holding structure provided in a front passenger-side door 1 will be described as an example, but the present invention is not limited thereto, and may be applied to the front driver's-side door or the rear passenger-side or driver's-side door. Also, the door is not limited to a hinged door, and may be a sliding door. The door trim 2 is a resin molded part.

Also, in the vehicle of the present embodiment, a seat back 31 of a seat 30 adjacent to the door 1 (e.g., passenger seat in the case of the front passenger-side door 1) can incline forward, and a seat cushion 32 can displace downward. The seat back 31 can incline forward on the seat cushion 32 side such that a front surface part (backrest part) 31a of the seat back 31 opposes an upper surface part (seating surface) 32a of the seat cushion 32. Also, the seat cushion 32 displaces downward when the seat back 31 inclines forward. With the seat back 31 inclined in this manner, a back surface part 31b of the seat back 31 forms a horizontally flat surface, and a fully flat floor can be formed in the vehicle interior by inclining the other seats in a similar manner.

In the door trim 2, an arm rest 3 is provided in the vicinity of the height position of the elbow of a passenger who is seated. The arm rest 3 projects on the vehicle interior side, and extends in the front-and-rear direction of the vehicle body, upward of a middle part of the door trim 2 in the up-and-down direction. The arm rest 3 has an upper surface part 3a on which the seated passenger rests his or her elbow, and a side surface part 3b that extends downward on the vehicle interior side continuously from the upper surface part 3a. Also, the door trim 2 is provided with a lower pocket 4 capable of storing articles of various shapes such as cylindrical and box-shaped articles. The lower pocket 4 is provided downward of the arm rest 3, and has a storage hole 4a that is open upward and capable of holding articles. Also, in the door trim 2, a pull handle attachment part 5 to which is attached a pull handle for the seated passenger to operate in order to open and close the door is provided upward of the arm rest 3.

The upper surface part 3a of the arm rest 3 is provided with a switch attachment part 6 to which a switch for the seated passenger to open and close the window is attached and a pull pocket 7 for the passenger to hold onto when opening and closing the door. The pull pocket 7 is located upward of the lower pocket 4. The pull pocket 7 has a hole part 7a that is open in the upper surface part 3a of the arm rest 3. Also, the pull pocket 7 is provided with the hanger part 10 on which can be hung a handle portion 41 of a bag-like item/article 40 such as a shopping bag, handbag or the like. The hanger part 10 has a plurality of convex parts 11 and concave parts 12 formed in an upper end part 7c of a side wall part 7b on the vehicle interior side of the pull pocket 7 in the side surface part 3b of the arm rest.

As shown in FIGS. 3 to 5, the arm rest 3 is constituted as an arm rest component 24 that is separate from a door trim main body component 21 constituting the entirety of the door trim 2. In the arm rest component 24, the switch attachment part 6, the pull pocket 7 and the hanger part 10 are integrally formed in advance, and attached to a predetermined position of the door trim main body component 21. In the door trim main body component 21, a protrusion 22 is formed on the inner surface side of the side wall part 7b of the pull pocket 7 (inside of the pocket) to make it easier for the passenger to hold onto the pull pocket 7, in a state where the arm rest component 24 is mounted.

In the door trim main body component 21, an attachment surface 9 that extends on the inner panel side from an opening hole 8 formed in the door trim main body component 21 is fixed with a bolt or the like to the door panel (inner panel), which is not illustrated, after the arm rest component 24 is mounted. The opening hole 8 is formed in two places in the door trim main body component 21 so as to sandwich the pull pocket 7 in the front-and-rear direction of the vehicle body, and extends on the vehicle outer side (inner panel side), and the attachment surface 9 is formed at the terminal end of the opening hole 8. Note that the opening hole 8 is closed by a cover member 23, which is not illustrated, after the door trim 2 is fixed to the door panel (inner panel), which is not illustrated.

The convex parts 11 of the hanger part 10 include a first convex part 11a formed in a middle part in the front-and-rear direction of the vehicle body in the upper end part 7c of the side wall part 7b on the vehicle interior side of the pull pocket 7, and two second convex parts 11b arranged one on either side of the first convex part 11a. The first convex part 11a is longer in length than the second convex parts 11b in the front-and-rear direction of the vehicle body, and approximately equivalent in height in the up-and-down direction. Also, the concave parts 12 of the hanger part 10 include two first concave parts 12a adjacent one on either side of the first convex part 11a, and two second concave parts 12b adjacent one on either side of the second convex parts 11b. The first concave parts 12a and the second concave parts 12b are approximately equivalent in length in the front-and-rear direction of the vehicle body and depth in the up-and-down direction. Also, the first convex part 11a and the second convex parts 11b are equivalent in height to or lower than the upper surface part 3a of the arm rest 3.

In the hanger part 10, the first concave parts 12a are arranged one on either side of the first convex part 11a, the second convex parts 11b are arranged one on either side of the opposite side of the first concave parts 12a to the first convex part 11a, and the second concave parts 12b are arranged one on either side of the opposite side of the second convex parts 11b to the first convex part 11a. In other words, the first convex part 11a, the first concave parts 12a, the second convex parts 11b and the second concave parts 12b are arranged alternately in the front-and-rear direction of the vehicle body.

In the present embodiment, a structure in which the convex parts 11 are provided in three places and the concave parts 12 are provided in four places is illustrated, but as long as there is at least one convex part 11 and two concave parts 12 as will be described later with FIGS. 6F to 6H as variations of the present embodiment, the function of hanging the handle portion of a bag-like item can be provided. That is, in the present embodiment, the second concave parts 12b are respectively adjacent to the front end and rear end of the upper end part 7c of the side wall part 7b on the vehicle interior side of the pull pocket 7, but the second concave parts 12b may be omitted and the second convex parts 11b may be respectively arranged at the front end and rear end of the upper end part 7c of the side wall part 7b on the vehicle interior side of the pull pocket 7. In either case, the second convex parts 11b or the second concave parts 12b are arranged near a region where the rigidity of the door trim 2 is high, and thus the rigidity of the hanger part 10 increases.

Also, because the seat back 31 of the seat 30 of the present embodiment can be inclined forward, the bag-like item 40 hung on the convex parts 11 or the concave parts 12 can be stably held by the back surface part 31b of the seat back 31 in the inclined state.

Also, because the door trim main body component 21 is fixed to the door panel (inner panel) of the door 1 via the opening holes 8 and the attachment surfaces 9 so as to sandwich the pull pocket 7 in the front-and-rear direction of the vehicle body, the hanger part 10 can be formed in a region of high rigidity in the arm rest 3.

Also, the first convex part 11a and the second convex parts 11b of the hanger part 10 are equivalent in height to or lower than the upper surface part 3a of the arm rest 3. A structure that is able to stably hold the bag-like item 40 can thereby be realized, without impairing the operational feel when opening and closing the door.

Form of Hanger Part

Next, the form and function of the hanger part 10 provided in the armrest 3 of the present embodiment will be described, with reference to FIGS. 6A to 6H.

Figure 6A:
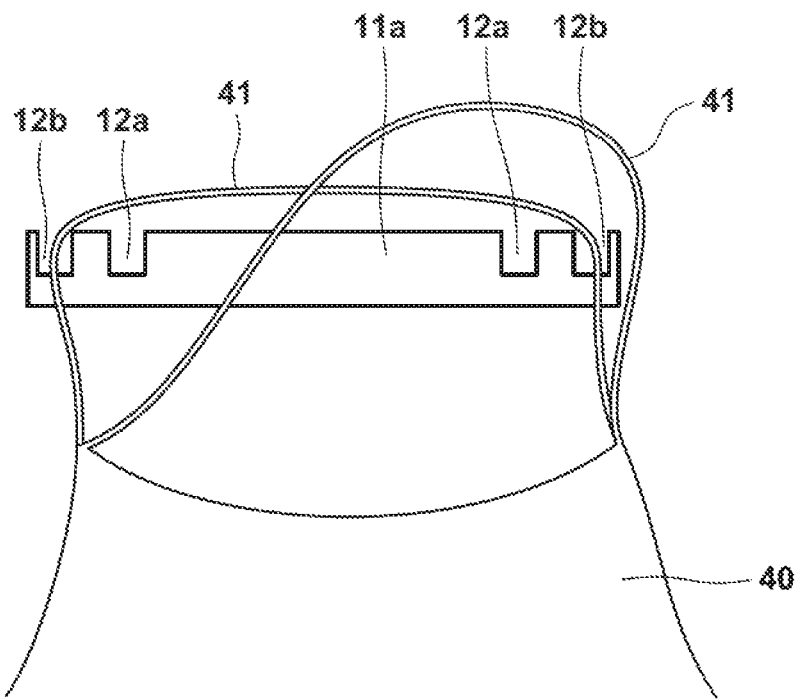
FIG. 6A is a diagram illustrating the form and function of the hanger part of the embodiment.

FIGS. 6A to 6E show examples in the case where the convex parts 11 are provided in three places and the concave parts 12 are provided in four places in the hanger part 10 as in the present embodiment. In this form, it is possible to hang the handle portion 41 of a bag-like item (at least one of the handle portions 41 if there are a plurality thereof, or the handle portion of another bag-like item) on the first concave parts 12a or the second concave parts 12b on both sides in the front-and-rear direction of the vehicle body with the first convex part 11a sandwiched therebetween as shown in FIG. 6A.

Figure 6B:
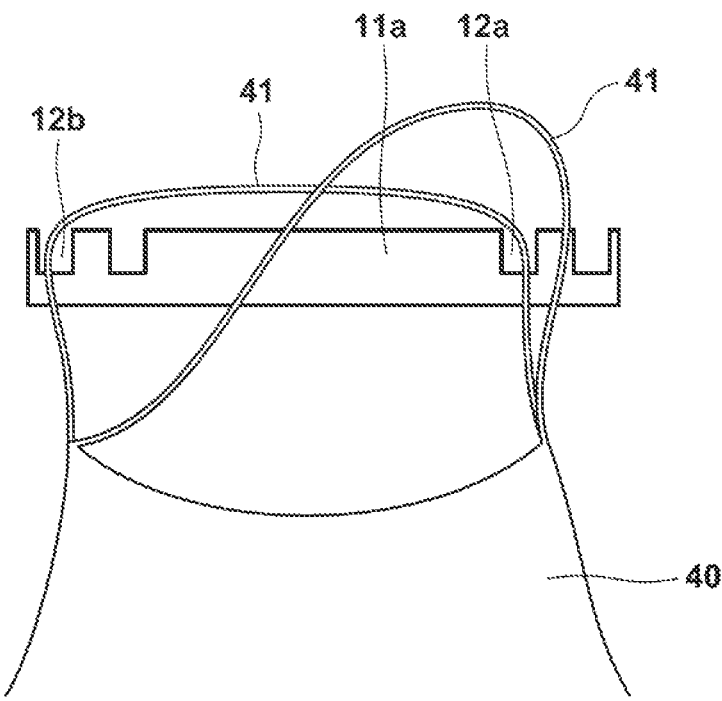
FIG. 6B is a diagram illustrating the form and function of the hanger part of the embodiment.
Figure 6C:
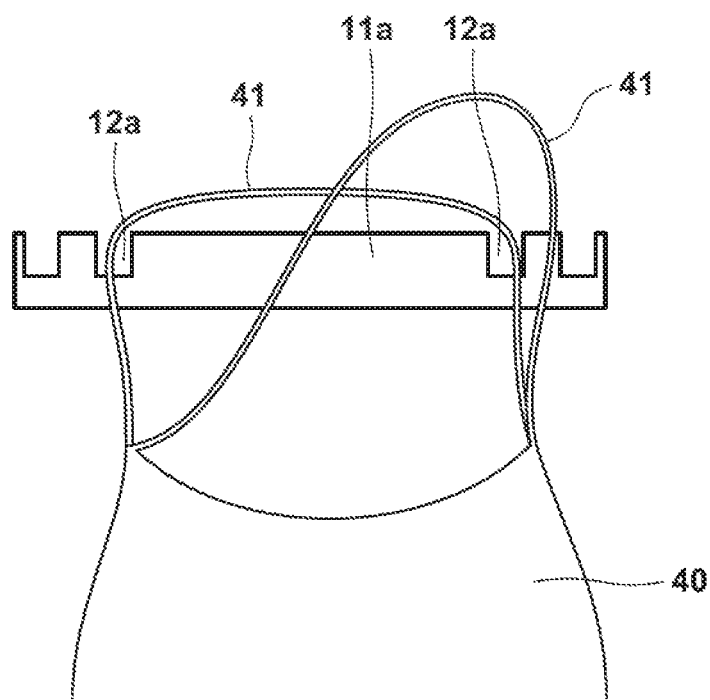
FIG. 6C is a diagram illustrating the form and function of the hanger part of the embodiment.

Also, it is possible to hang the handle portion 41 of a bag-like item (at least one of the handle portions 41 if there are a plurality thereof) on the first concave part 12a on the front side of the first convex part 11a and the second concave part 12b on the rear side of the first convex part 11a as shown in FIG. 6B. Furthermore, it is possible to hang the handle portion 41 of a bag-like item (at least one of the handle portions 41 if there are a plurality thereof) on the first concave parts 12a on both sides of the first convex part 11a as shown in FIG. 6C.

Figure 6D:
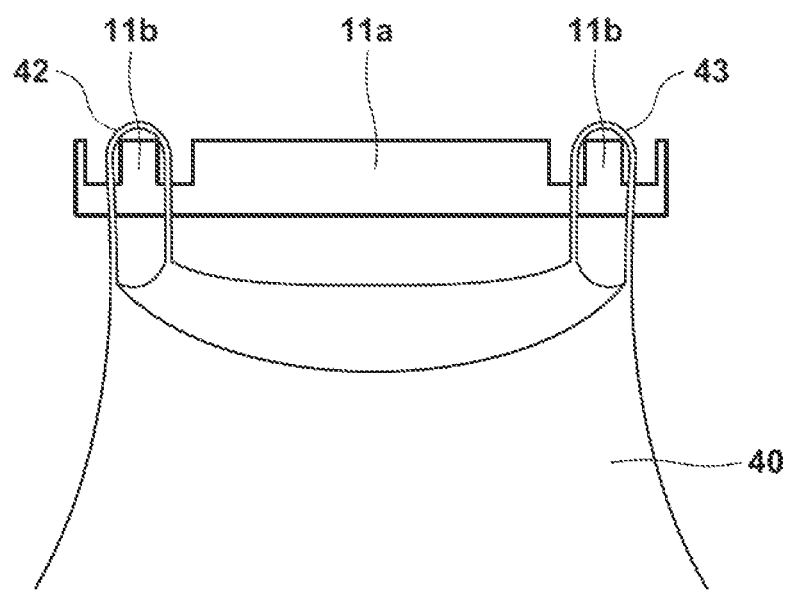
FIG. 6D is a diagram illustrating the form and function of the hanger part of the embodiment.

Also, it is possible to hang one handle portion 42 of the handle portions 41 of a bag-like item (at least one of the handle portions 41 if there are a plurality thereof) on one of the second convex parts 11b that are on both sides of the first convex part 11a, and to hang the other handle portion 43 (or the handle portion of another bag-like item) on the other second convex part 11b as shown in FIG. 6D. Also, it is possible to hang both of the handle portions 41 of a bag-like item (or the handle portions of another bag-like item) on one of the second convex parts 11b as shown in FIG. 6E.

FIG. 6F shows an example in the case of a structure in which the hanger part 10 is provided with one convex part 11 in the middle as a variation of the present embodiment. FIG. 6F can also be described as a structure in which the hanger part 10 is provided with two concave parts 12 (one on either side of the convex part). In this form, it is possible to hang the handle portion 41 of a bag-like item (at least one of the handle portions 41 if there are a plurality thereof, or the handle portion of another bag-like item) on the convex part 11 as shown in FIG. 6F. Note that the convex part 11 may be of any length in the front-and-rear direction that enables the handle portions of a bag-like item to be hung thereon.

Figure 6G:
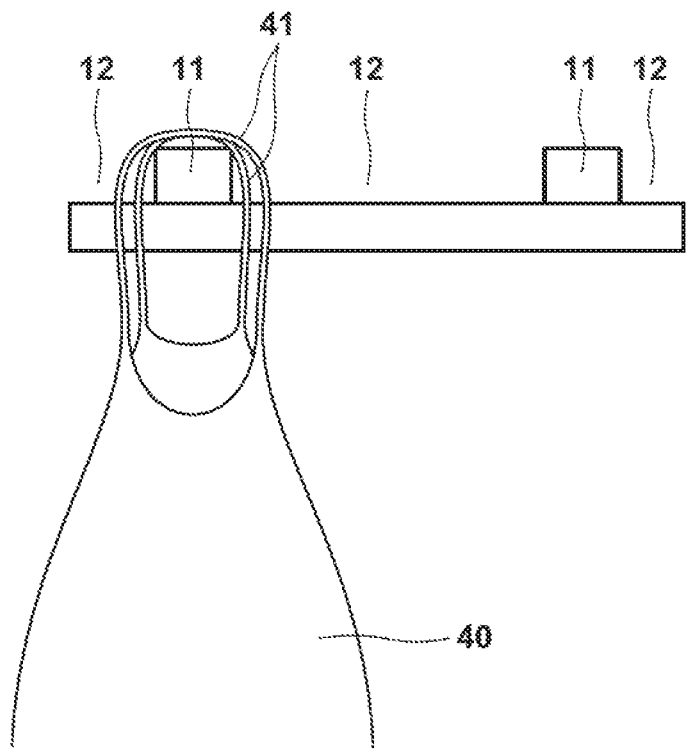
FIG. 6G is a diagram illustrating the form and function of the hanger part of the embodiment.
Figure 6H:
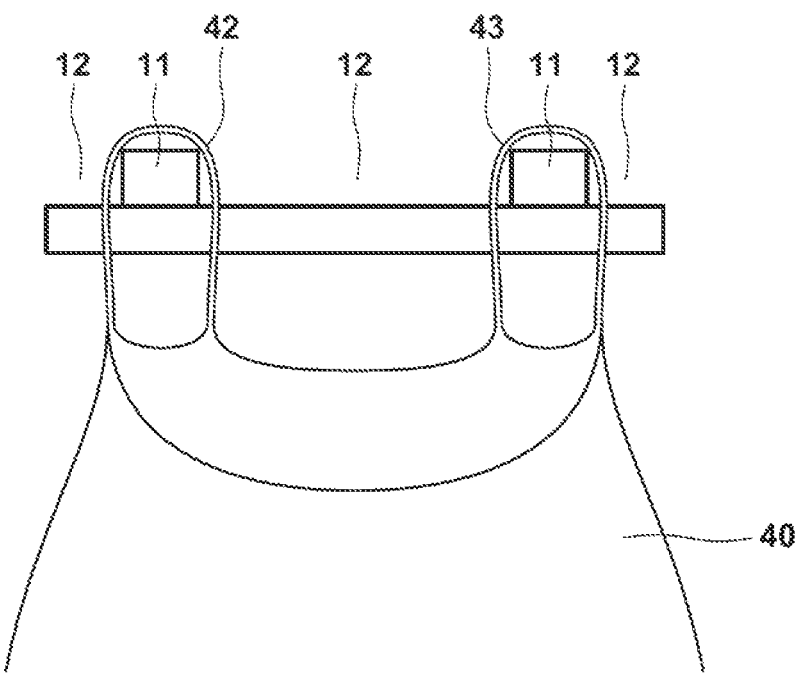
FIG. 6H is a diagram illustrating the form and function of the hanger part of the embodiment.

FIGS. 6G and 6H show an example in the case of a structure in which the hanger part 10 is provided with two convex parts 11 at a predetermined distance from each other as a variation of the present embodiment. FIGS. 6G and 6H can also be described as showing a structure in which the hanger part 10 is provided with three concave parts 12 (between and on either side of the convex parts). In this form, it is possible to hang both handle portions 41 of a bag-like item (or the handle portions of another bag-like item) on one of the two convex parts 11 as shown in FIG. 6G. Furthermore, it is possible to hang one handle portion 42 of the handle portions 41 of a bag-like item (at least one of the handle portions 41 if there are a plurality thereof) on one of the first convex parts 11, and to hang the other handle portion 43 (or the handle portion of another bag-like item) on the other of the two first convex parts 11 as shown in FIG. 6H.

In this way, a user is able to selectively use forms of hanging the bag-like item 40 according to the situation, such as hanging the bag-like item collectively on one place, hanging the bag-like item on two separate places, and hanging the bag-like item across two places.

According to the abovementioned embodiment, a hanger part 10 having at least one convex part 11 and/or a plurality of concave parts 12 is provided in an upper end part 7c of a side wall part 7b on a vehicle interior side in a pull pocket 7 provided in a door trim 2 of a door 1 and operable by a passenger when opening and closing the door. The bag-like item 40 can thereby be held in a stable manner with a simple structure obtained simply by improving existing components.

SUMMARY OF EMBODIMENT

First Aspect

At least one convex part 11 and/or a plurality of concave parts 12 are provided in an upper end part 7c of a side wall part 7b on a vehicle interior side in a recess-shaped part 7 provided in an interior material 2 of a door 1 of a vehicle and operable by a passenger when opening and closing the door.

According to the first aspect, the bag-like item 40 can be held in a stable manner with a simple structure.

Second Aspect

In the first aspect, the convex parts 11a and 11b are provided in a plurality of places.

According to the second aspect, a user is able to selectively use forms of hanging the bag-like item 40 according to the situation, such as hanging the bag-like item collectively on one place, hanging the bag-like item on two separate places, and hanging the bag-like item across two places.

Third Aspect

In the first or second aspect, the concave parts 12a and 12b are provided in four places.

According to the third aspect, a user is able to selectively use forms of hanging the bag-like item 40 according to the situation, such as hanging the bag-like item collectively on one place, hanging the bag-like item on two separate places, and hanging the bag-like item across two places.

Fourth Aspect

In the third aspect, the concave parts 12a and 12b are provided on both sides of one convex part 11a.

According to the fourth aspect, the form of hanging the bag-like item 40 collectively on one place can be realized.

Fifth Aspect

In any of the first to fourth aspects, the convex part 11b or the concave part 12b is provided at an end part of the side wall part 7b in a front-and-rear direction of a vehicle body.

According to the fifth aspect, the convex part 11b or the concave part 12b is arranged near a region where the rigidity of the interior material 2 is high, thus enabling the rigidity of the convex part 11b or the concave part 12b to be improved.

Sixth Aspect

In the second aspect, the convex part 11 has a first convex part 11a and two second convex parts 11b provided adjacent to a concave part 12a provided on both sides of the first convex part 11a.

According to the sixth aspect, a user is able to selectively use forms of hanging the bag-like item 40 according to the situation, such as hanging the bag-like item collectively on one place, hanging the bag-like item on two separate places, and hanging the bag-like item across two places.

Seventh Aspect

In any of the first to sixth aspects, a seat 30 adjacent to the door 1 has a seat back 31 inclinable on a seat cushion 32 side.

According to the seventh aspect, an bag-like item hung on the convex part 11 or the concave part 12 can be stably held by the back surface part 31b of the seat back 31 in a state where the seat back 31 is inclined.

Eighth Aspect

In any of the first to seventh aspects, the interior material 2 is fixed to a panel member of the door 1 on both sides of the recess-shaped part 7 in the front-and-rear direction of the vehicle body.

According to the eighth aspect, a convex part or a concave part is arranged between regions 8 and 9 where the interior material 2 is firmly fixed to the door panel, thus enabling rigidity to be improved.

Ninth Aspect

In any of the first to eighth aspects, the convex part 11 is equivalent in height to or lower than an upper surface part 3a of a region where the recess-shaped part 7 is provided.

According to the ninth aspect, a structure that is able to stably hold the bag-like item 40 can be realized, without impairing the operational feel when opening and closing the door.

The present invention is not limited to the above embodiments, and various modifications and variations can be made without departing from the spirit or scope of the present invention. Therefore, to apprise the public of the scope of the present invention, the following claims are made.

What is claimed is:

1. An item holding structure in which one or more convex or concave parts are provided in an upper end part of a side wall part on a vehicle interior side in a recess-shaped part provided in an interior material of a door of a vehicle and operable by a passenger when opening and closing the door, wherein the interior material of the door has a hollow part that recesses so as to project in an outer side of a vehicle width direction under the recess-shaped part, and the item held by the one or more convex or concave parts can be accommodated in the recessed part.

2. The item holding structure according to claim 1, wherein a convex part is provided in a plurality of places.

3. The item holding structure according to claim 1, wherein the concave parts are provided in four places.

4. The item holding structure according to claim 3, wherein the concave parts are provided on both sides of one convex part.

5. The item holding structure according to claim 1, wherein the one or more convex or concave parts are provided at an end part of the side wall part in a front-and-rear direction of a vehicle body.

6. The item holding structure according to claim 2, wherein the convex part has a first convex part and two second convex parts provided adjacent to a concave part provided on both sides of the first convex part.

7. The item holding structure according to claim 1, wherein a seat adjacent to the door has a seat back inclinable on a seat cushion side.

8. The item holding structure according to claim 1, wherein the interior material is fixed to a panel member of the door on both sides of the recess-shaped part in the front-and-rear direction of the vehicle body.

9. The item holding structure according to claim 1, wherein any convex part is equivalent in height to or lower than an upper surface part of a region where the recess-shaped part is provided.

* * * * *